F. M. PLATT.
MOTOR VEHICLE.
APPLICATION FILED AUG. 29, 1913.
1,097,261.
Patented May 19, 1914.
2 SHEETS—SHEET 1.
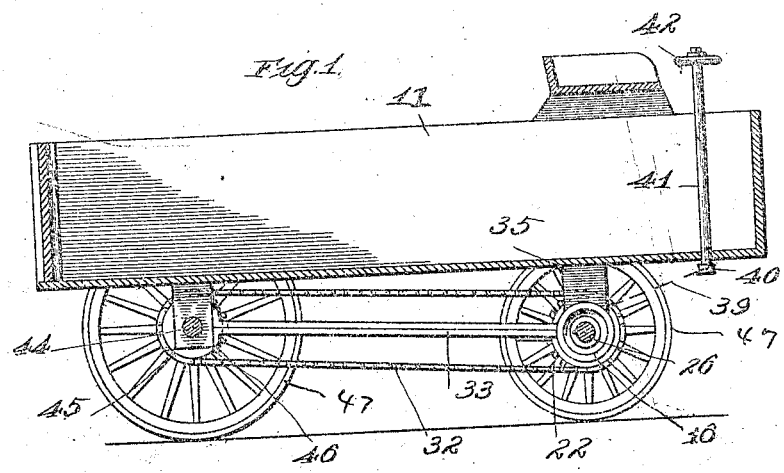
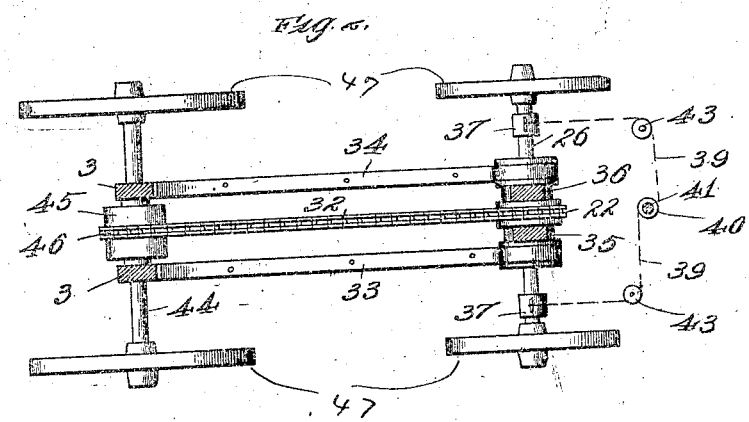
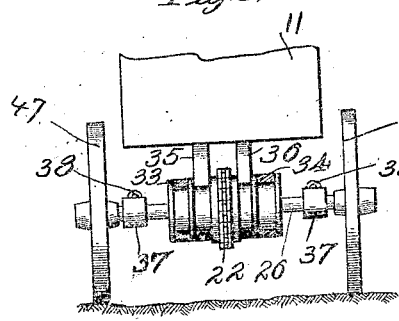
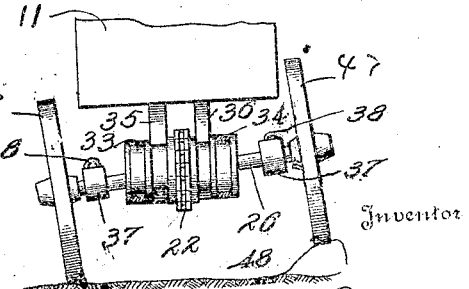
Witnesses
Inventor
Francis M. Platt
By Edwin S. Clarkson
his Attorney F. M. PLATT.
MOTOR VEHICLE.
APPLICATION FILED AUG. 29, 1913.
1,097,261.
Patented May 19, 1914.
2 SHEETS—SHEET 2.
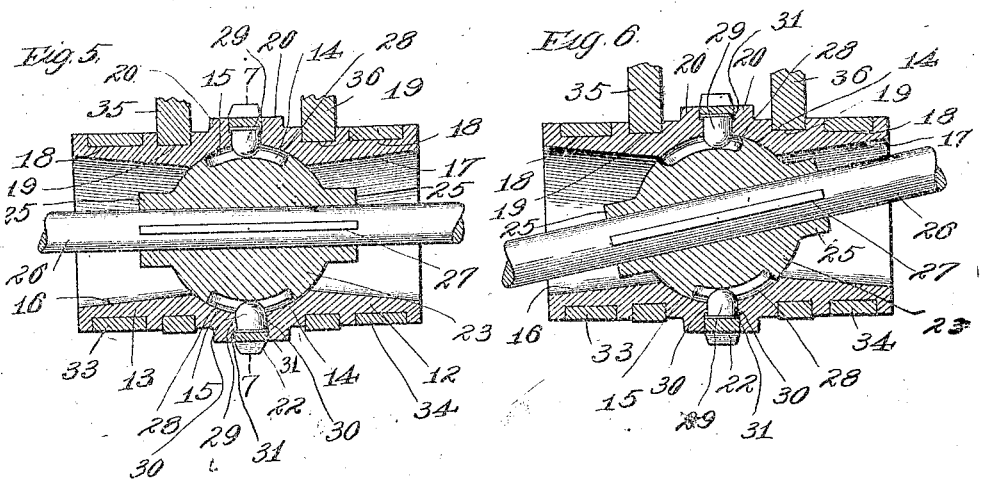
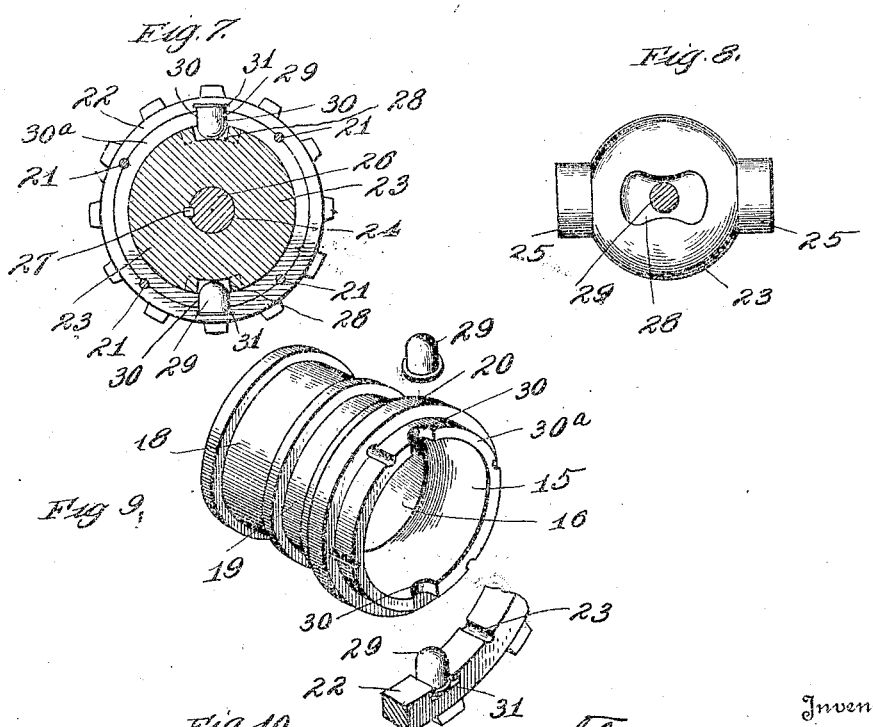

UNITED STATES PATENT OFFICE.

FRANCIS M. PLATT, OF STUART, FLORIDA.

MOTOR-VEHICLE.

1,097,261.    Specification of Letters Patent.    Patented May 19, 1914.

Application filed August 29, 1913. Serial No. 787,308.

*To all whom it may concern:*

Be it known that I, FRANCIS M. PLATT, a citizen of the United States, residing at Stuart, county of Palm Beach, and State of Florida, have invented certain new and useful Improvements in Motor-Vehicles, of which the following is a specification.

The motor truck has proven a valuable adjunct to business, but as now constructed it is not fully adapted to all the uses to which one living in the country desires to put his vehicles. For instance, the present motor truck is not adapted to field use, nor to rough roads such as are found through woods where the surface is uneven and often covered with fallen trees and fairly good sized rocks, which would be serious obstacles to the progress of the average motor truck and damage them to a material degree by reason of the torsional strain imparted to the vehicle when one wheel passes over an obstruction, because of the fact that there is no vertical movement to the front axle, aside from that permitted by the springs, which is not enough to eliminate such strains.

The object of my invention is to provide a construction whereby the front axle of a motor truck is free to move longitudinally and vertically without changing the angular direction of its propelling medium.

A further object of my invention is to substitute for the usual fifth wheel of a vehicle a ball and socket joint for the axle, whereby the axle may move vertically and longitudinally, relatively to the body of the vehicle to permit the wheels to adapt themselves to all irregularities of the surface over which they are traveling and to ride over obstructions without imparting a relative movement to the vehicle body.

A still further object of my invention is to provide a motor truck with bodily revoluble axles, a driving connection between said axles, a ball and socket joint for one of said axles so that it may swing longitudinally and vertically without disturbing the angular relation between the driving connections; and with these and minor objects in view my invention consists of the parts and combination of parts as will be more fully hereinafter pointed out.

In the drawings: Figure 1 is a side elevation of a motor truck embodying my invention; Fig. 2 is a top plan view of the same with the body removed; Fig. 3 is a front elevation of the truck, a portion of the body being broken away; Fig. 4 is a view similar to Fig. 3 illustrating the angular relation of the axle to the body, when a wheel is passing over an obstruction; Figs. 5 and 6 are enlarged detail sectional views of the ball and socket joint; Fig. 7 is a sectional view on the line 7—7 Fig. 5; Fig. 8 is an elevation of the ball; Fig. 9 is a perspective view of one section of the socket; Fig. 10 is a detail perspective view of the sprocket wheel.

The reference numeral 11 designates a wagon body which may be of any approved type, the particular type shown being best adapted for farm use. The socket member comprises two parts, 12 and 13, each of which has a concaved seat 14 and 15 respectively. The inner face of the collars is flared outwardly and constitutes bearing surfaces 16 and 17, while annular grooves 18, 19 are formed on the outer faces of the collars.

20 are flanges formed on the inner ends of the collars through which bolts 21 pass to secure the parts together.

22 is a sprocket wheel secured between the two collars 12 and 13 on the flanges 30ª and provided with bolt passages 23.

The ball member 24 of the joint is adapted to fit in the socket formed by the concaved seats 14 and 15 in the collars 12 and 13 and is provided with an opening 24 therethrough, at each end of which is an annular flange 25, through both of which the front axle 26 is constructed to pass; said axle being rigidly secured to the ball by means of the key 27. The ball is provided on diametrically opposite sides with a recess 28, which by reason of its peculiar shape may be called a dumb-bell shaped recess.

29 are pins, the heads of which are seated in recesses 30 in the flanges 30ª on the collars 12 and 13, the heads of the pins projecting into a recess 31 in the sprocket wheel, while the inner ends of the pins project into the dumb-bell recesses 28 in the ball, whereby the ball is connected to the sprocket wheel and collars for driving purposes, but by reason of the dumb-bell recess may change its angular position relatively to the collars and sprocket wheel without disturbing the angular relation of the sprocket wheel 22 with the direct line and angular position of the driving chain 32, so that no torsional strain is imparted to the sprocket and driving chain, as will be readily understood. Substantial reach poles 33 and 34 extend between the front and rear axles, each comprising two members, the ends of which are to form a collar or cuff which extends around the collars 12 and 13 and are seated in the grooves 18 thereof and constitute bearings for the collars 12 and 13.

35 and 36 are braces secured to the wagon body and terminate at their lower ends in bands which are secured in the grooves 19, said grooves constituting bearings therefor. The wagon body may be readily detachable from the brackets and any other type of body readily secured thereto. The axle 26 is provided with bands 37 loosely mounted thereon. 38 is an eye secured to said bands.

39 are steering chains, one end of each of which is secured in the eye 38 of the respective bands 37, while the other end is secured to opposite sides of a winding drum 40, which is operated by a steering shaft 41 having a steering wheel 42.

43 are idlers secured to the wagon body over which the chain 39 moves. The rear axle 44 is provided with a suitable motor 45, driving a sprocket wheel 46 by which the chain 32 is driven. The rear ends of the reach poles 33 and 34 are suitably secured to the rear axle as shown. The rear axle is driven bodily.

47 are traction wheels secured to the respective axles in any well known manner.

In order to get the maximum power it is necessary that the sprocket wheels 22 and 46 remain constantly in alinement with each other in order that there may be no drag or torsional strains on the chain, which I accomplish by means of the ball and socket joint. By means of the ball and socket joint the vehicle may be turned in a comparatively small space and the wheels and axle are free to be tilted from the horizontal as the wheels pass over an obstruction, (as 48), as shown in Fig. 4, without disturbing the angular position of the sprocket wheel 22 with respect to the chain 32 and without imposing any strains on the balance of the running gear or body of the vehicle. The angular position of the axle will also be changed whenever one of the wheels enters a rut or hole in the roadway. By positively driving each axle I gain a maximum of power as each wheel serves as a traction wheel thereby enabling the engine to pull the vehicle over obstructions and out of ditches and holes.

What I claim is:

1. In a motor truck, the combination with a body, of an axle bearing consisting of a ball and socket joint, comprising collars suspended from said body, and having ball seats, a sprocket wheel secured to and between said collars, a ball mounted in said seats, a wheel axle rigidly secured to said ball, said ball having diametrically opposite dumb-bell shaped recesses, pins projecting from the collars into said recesses in the ball loosely keying the ball to said collars, whereby the ball and the axle carried thereby may change their angular position relative to the sprocket wheel.

2. In a motor truck, the combination with a body, of an axle bearing consisting of a ball and socket joint, comprising collars suspended from said body, and having ball seats, a sprocket wheel secured to and between said collars, a ball mounted in said seats, a wheel axle rigidly secured to said ball, said ball having diametrically opposite dumb-bell shaped recesses, coinciding recesses formed in the collars and in the sprocket wheel and pins mounted in said recesses and projecting into the recesses of the ball whereby the ball is loosely keyed to the collars and may change its angular position relative to the sprocket wheel and collars.

3. In a motor truck, the combination with a body, brackets depending from said body, of an axle bearing consisting of a ball and socket joint comprising collars journaled in said brackets and having ball seats, a sprocket wheel secured to and between said collars, a ball mounted in said seats, a wheel axle rigidly secured to said ball, said ball having diametrically opposite dumb-bell shaped recesses, coinciding recesses formed in the collars and in the sprocket wheel, pins mounted in said recesses and projecting into the recesses of the ball whereby the ball and the axle carried thereby is loosely keyed to the collars, a rear wheel axle, a sprocket wheel on said rear axle, a motor to drive said rear axle sprocket wheel, a chain connecting the sprocket wheels of the two axles; the ball and socket joint for the first-named axle permitting said axle to change its position both vertically and longitudinally relative to the sprocket wheel on the front axle whereby the sprocket wheel on the front axle remains in constant angular relation to the drive chain irrespective of the angular relation of the front axle thereto.

4. In a motor truck, the combination with a body, brackets depending from said body, of an axle bearing consisting of a ball and socket joint comprising collars journaled in said brackets and having ball seats, a sprocket wheel secured to and between said collars, a ball mounted in said seats, a wheel axle rigidly secured to said ball, said ball having diametrically opposite dumb-bell shaped recesses, coinciding recesses formed in the collars and in the sprocket wheel, pins mounted in said recesses and projecting into the recesses of the ball whereby the ball and the axle carried thereby is loosely keyed to the collars, a rear wheel axle, a sprocket wheel on said rear axle, a motor to drive said rear axle sprocket wheel, a chain connecting the sprocket wheels of the two axles; the ball and socket joint for the first-named axle permitting said axle to change its position both vertically and longitudinally relative to the sprocket wheel on the front axle whereby the sprocket wheel on the front axle remains in constant angular relation to the drive chain irrespective of the angular relation of the front axle thereto; a flexible steering medium attached to said front axle and means to operate the steering medium.

In testimony whereof I affix my signature in presence of two witnesses.

FRANCIS M. PLATT.

Witnesses:
N. C. PLATT,
EDWIN S. CLARKSON.